(12) United States Patent
Hunter et al.

(10) Patent No.: US 10,162,186 B2
(45) Date of Patent: Dec. 25, 2018

(54) VIRTUAL IMAGE PHASE ARRAY

(71) Applicant: LightMachinery Inc., Nepean, Ontario (CA)

(72) Inventors: John H. Hunter, Almonte (CA); Ian J. Miller, Ottawa (CA); Shane Boisclair, Ottawa (CA); Edward S. Williams, Kanata (CA); Chris Wimperis, Osgoode (CA); Vaz Zastera, Kemptville (CA)

(73) Assignee: LightMachinery Inc., Ottawa, Ontario (CA)

( * ) Notice: Subject to any disclaimer, the term of this patent is extended or adjusted under 35 U.S.C. 154(b) by 501 days.

(21) Appl. No.: 14/703,944

(22) Filed: May 5, 2015

(65) Prior Publication Data
US 2015/0316764 A1    Nov. 5, 2015

Related U.S. Application Data

(60) Provisional application No. 61/988,533, filed on May 5, 2014.

(51) Int. Cl.
| | |
|---|---|
| *G02B 27/14* | (2006.01) |
| *G02B 27/42* | (2006.01) |
| *G02B 27/00* | (2006.01) |
| *G02B 6/293* | (2006.01) |
| *G02B 1/11* | (2015.01) |

(52) U.S. Cl.
CPC ....... *G02B 27/144* (2013.01); *G02B 6/29358* (2013.01); *G02B 27/0087* (2013.01); *G02B 27/4205* (2013.01); *G02B 1/11* (2013.01)

(58) Field of Classification Search
CPC ............ G02B 6/29358; G02B 6/29394; G02B 6/29311; G02B 27/143; G02B 27/144; G02B 27/106; G02B 5/122; G02B 6/272
See application file for complete search history.

(56) References Cited

U.S. PATENT DOCUMENTS

| | | | | |
|---|---|---|---|---|
| 4,171,915 A | * | 10/1979 | Hesselink | G01N 21/45 356/517 |
| 6,678,056 B2 | * | 1/2004 | Downs | G02B 5/122 356/517 |
| 2003/0030908 A1 | * | 2/2003 | Cheng | G02B 6/29358 359/577 |
| 2012/0170000 A1 | * | 7/2012 | Imaoka | G02B 27/26 353/20 |

* cited by examiner

*Primary Examiner* — Robert E Tallman
(74) *Attorney, Agent, or Firm* — Teitelbaum Bouvetich & McLachlen; Neil Teitelbaum

(57) ABSTRACT

A virtual image phase array (VIPA) includes two parallel surfaces, a first highly-reflective surface with a highly-reflective coating, and a second partially-reflective surface. The first highly-reflective surface also requires an input zone with an anti-reflection coating, which abuts the highly-reflective coating, with a transition zone therebetween. Light enters the VIPA through the input zone, and reflects back and forth between the highly and partially reflective surfaces, gradually leaking out through the partially reflective surface. To minimize the transition zone and thereby minimize the input angle of incidence and maximize the number of reflections per unit of length, the substrate coated with the highly-reflective coating is subsequently polished at an acute angle resulting in the transition zone having the same sharp angle.

22 Claims, 12 Drawing Sheets

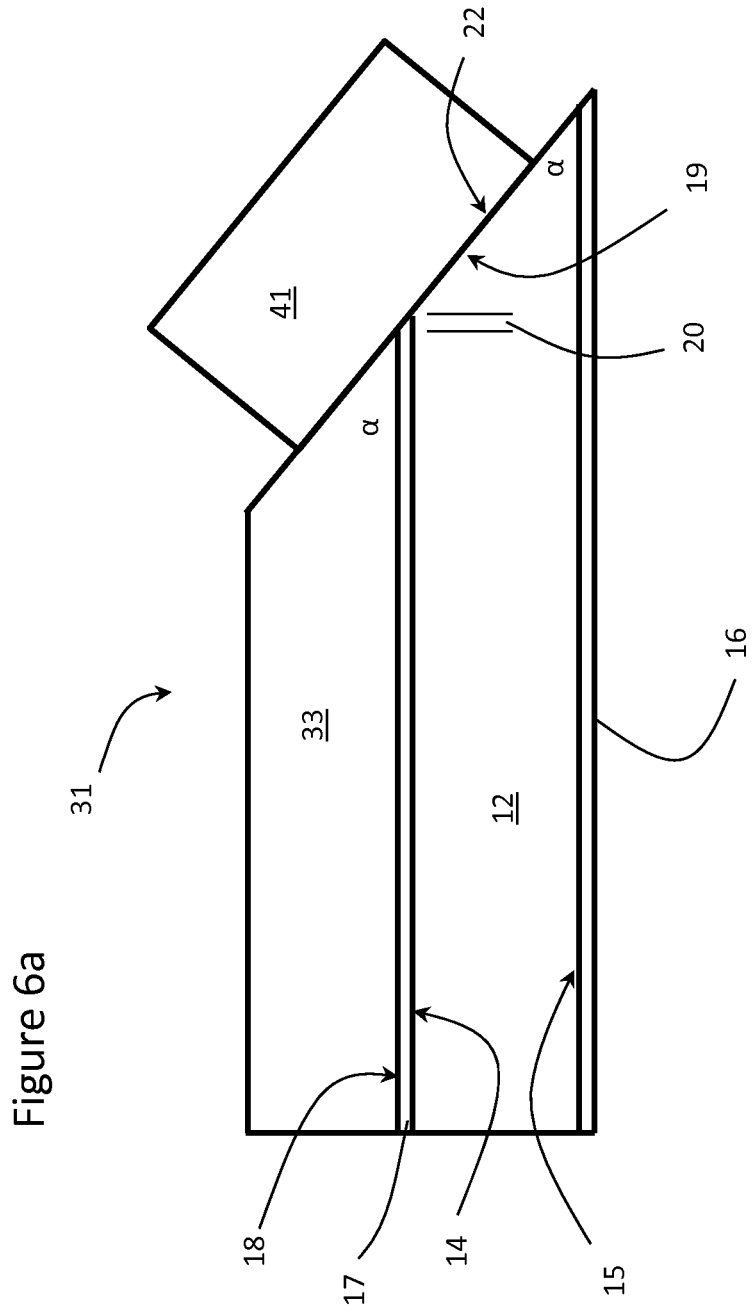

VIRTUAL IMAGE PHASE ARRAY

CROSS-REFERENCE TO RELATED APPLICATIONS

The present invention claims priority from U.S. Provisional Patent Application No. 61/988,533 filed, May 5, 2014, which is incorporated herein by reference.

TECHNICAL FIELD

The present invention relates to a virtual image phase array (VIPA), and in particular to a VIPA with an improved transition between input and reflective surfaces.

BACKGROUND OF THE INVENTION

With reference to FIG. 1, a conventional VIPA 1 includes two parallel surfaces, a first highly-reflective surface 2, which has a highly reflective coating 3 thereon, and a second partially-reflective surface 4 with a partially reflective coating 5 thereon. The first highly-reflective surface 2 also has an input, anti-reflection zone 6 with an anti-reflection coating 7, which abuts the highly-reflective coating 3, with a transition zone 8 therebetween.

Light 9 entering the VIPA 1, see FIG. 2, through the input zone 6, reflects back and forth across a gap formed by substrate 10 between the highly and partially reflective surfaces 2 and 4, respectively, gradually leaking out through the partially reflective surface 4. Because the two reflective surfaces 2 and 4 are highly parallel, the output beams have a well-defined phase relationship, which enables the use of the VIPA 1 as a spectrometer, dispersion compensator, multiplexer/demultiplexer or filter.

One of the keys to the operation of the VIPA 1 is a narrow transition zone 8 between the highly reflective surface 2 and the input zone 6. Conventionally, the width of the transition zone 8 is controlled with some sort of mask during the deposition of the highly-reflective coating 3 and the anti-reflection (AR) coating 7 by a number of coating processes, e.g. electron beam evaporation, sputtering, etc.

The mask could be a metal foil held in contact with the highly-reflective surface 2 during the deposition of the highly-reflective coating 3, or a photoresist that is exposed and developed during assembly. After coating, with the highly-reflective coating 3, the mask is removed, which may be a chemical removal process in the case of a photoresist. In either case, (or with any other masking technique), the width of the transition zone 8 is affected by the geometry of the mask, including the straightness of the mask, the thickness of the mask, the contact of the mask with the highly-reflective surface 2, and the deposition process shadowing of the edge of the highly-reflective surface 2. Typically, mechanical masking will result in a transition zone 8 with a width w of 50 µm or more.

For the input light 9 to be efficiently coupled into the VIPA 1, all of the light 9 must avoid the transition zone 8 during entry and after its first bounce from the partially reflective surface 4. The width w of the transition zone 8 thus sets a minimum entrance angle from a normal to the input zone 6 into the VIPA 1. Because VIPAs typically rely on a hundred or more bounces, a large transition zone 8 requires a large entrance angle resulting in a wider distance between bounces, and consequently increases the length of the VIPA 1 and the size of the associated optics in order to achieve the maximum spectral resolution of the device. Furthermore, the larger length increases the difficulty in manufacturing the VIPA 1, resulting in a higher cost.

An object of the present invention is to overcome the shortcomings of the prior art by providing a VIPA with a smaller transition zone to enable a smaller entrance angle for incoming light.

SUMMARY OF THE INVENTION

Accordingly, the present invention relates to a virtual image phase array (VIPA) comprising:
a transparent support substrate;
a first reflective coating on a first reflective surface of the transparent support substrate;
a second reflective surface separated by a gap from the first reflective coating;
wherein the transparent support substrate and the first reflective coating include a beveled edge at an acute angle from the second reflective surface forming a narrow transition region at the edge of the first reflective coating between the first reflective coating and the beveled edge of the support substrate.

Another aspect of the present invention relates to a method of fabricating a virtual image phase array (VIPA) comprising:
providing a first support substrate with a first surface and an end;
providing a first reflective coating on the first surface of the first support substrate;
providing a second reflective coating substantially parallel to the first reflective coating with a gap therebetween;
polishing the end of the first support substrate at an acute angle forming a beveled edge of the first support substrate and the first reflective coating, thereby forming a narrow transition region at the beveled edge of the first reflective coating between the first reflective coating and the beveled edge of the first support substrate.

BRIEF DESCRIPTION OF THE DRAWINGS

The invention will be described in greater detail with reference to the accompanying drawings which represent preferred embodiments thereof, wherein:
FIG. 6a illustrates a side view of an initial step in a manufacturing process of a VIPA in accordance with the present invention;
FIG. 6b illustrates a side view of a subsequent step in the manufacturing process of FIG. 6a.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
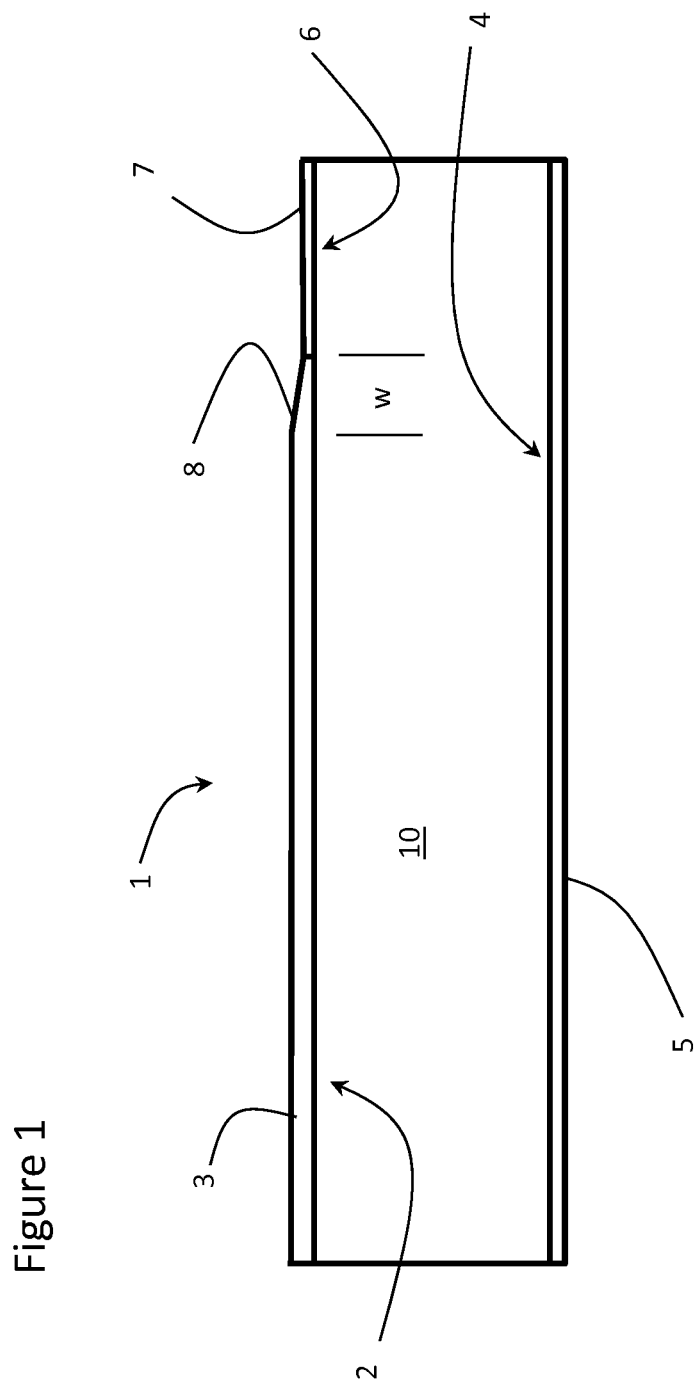
FIG. 1 illustrates a side view of a conventional VIPA.
Figure 2:
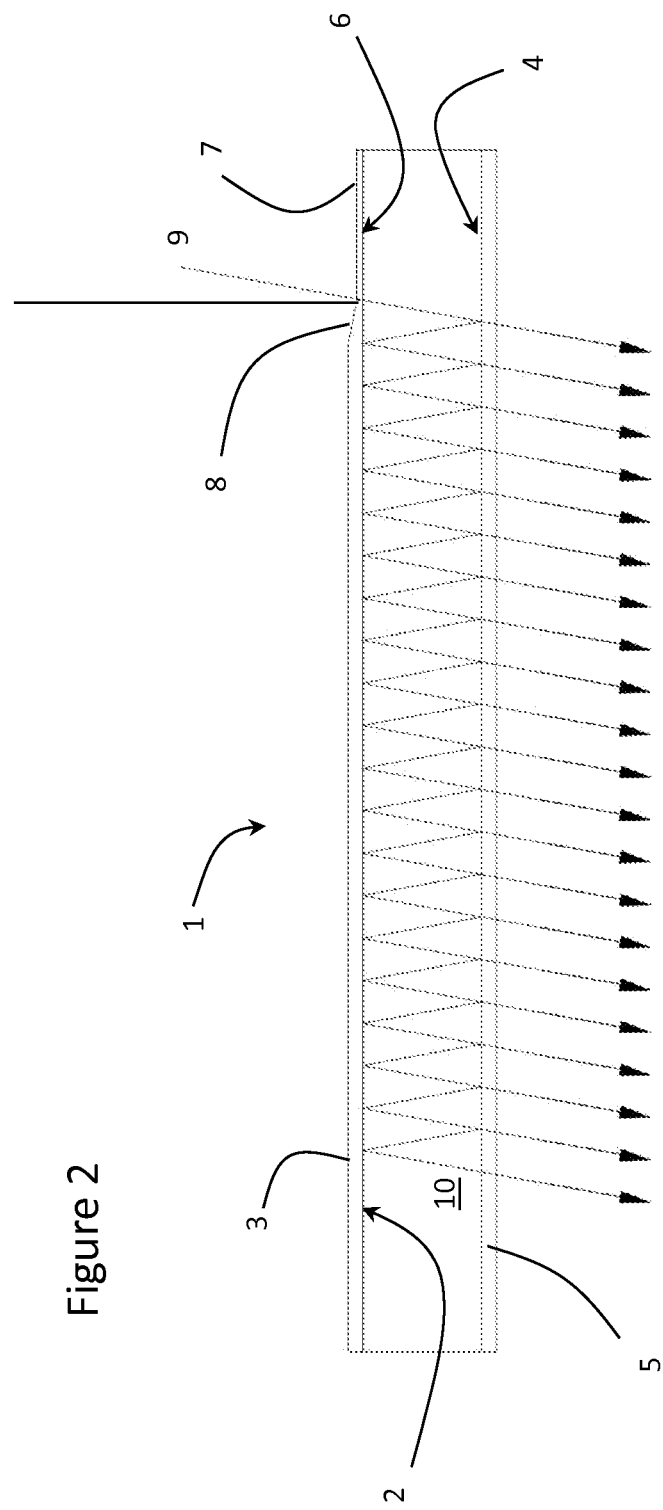
FIG. 2 illustrates a side view of the conventional VIPA of FIG. 1 including a representation of light.
Figure 3:
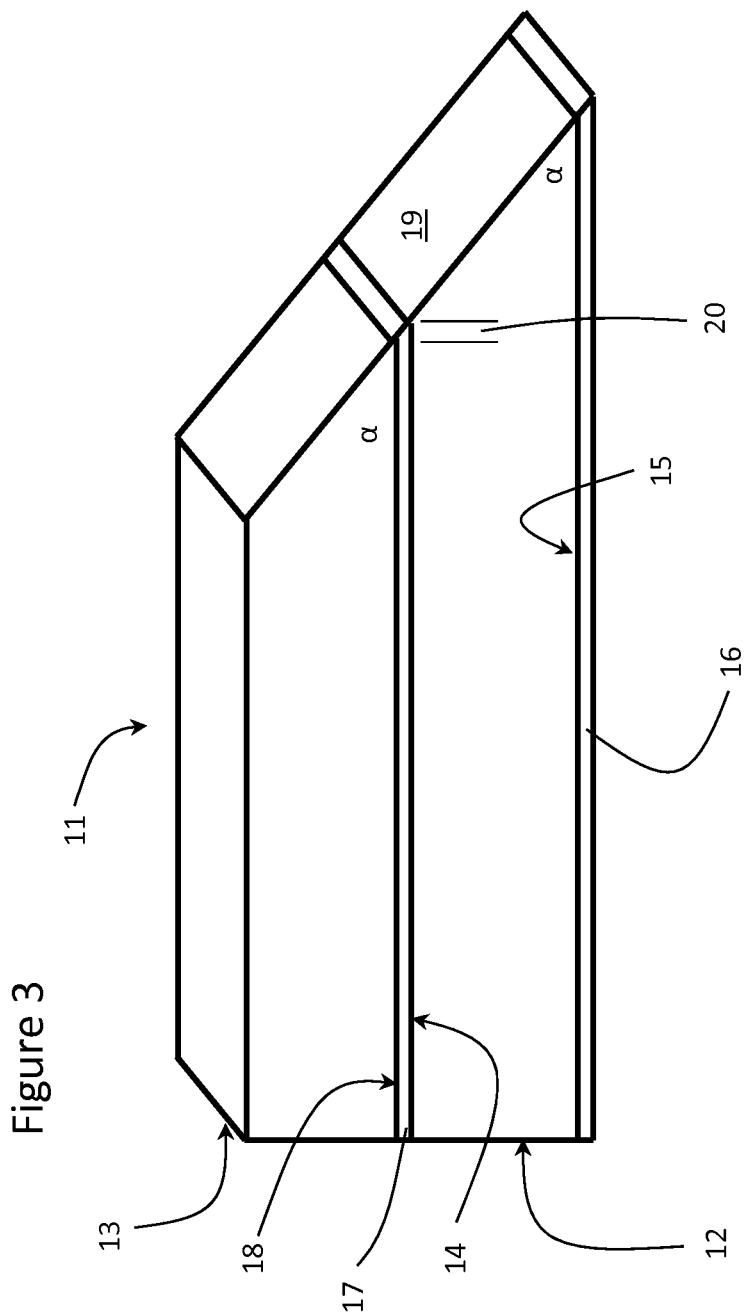
FIG. 3 illustrates an isometric view of a VIPA in accordance with the present invention.

With reference to FIG. 3, a virtual image phase array (VIPA) 11, in accordance with an embodiment of the present invention, may be comprised of two or three pieces of glass (or other optical material), preferably optically contacted together. In particular, the VIPA 11 may comprise a generally rectangular main supporting substrate 12, and a generally rectangular protective mounting substrate or backing plate 13. A matching input section 21 may also be provided, as hereinafter described with reference to FIG. 4. The substrates 12 and 13 are generally rectangular for simplicity of manufacture and handling, but other shapes, e.g. round, oval etc., are possible and within the scope of the invention.

The main supporting substrate 12, e.g. piece of glass or other transparent material, preferably includes flat and parallel upper and lower (or first and second) opposed surfaces 14 and 15, respectively, and accordingly has a uniform thickness. A transparent material, typically relates to a material suitably transparent at any wavelength of light, e.g. visible light, used in conjunction with the present invention. Flat preferably means with peak to valley flatness variations on the order of 10 nm for visible wavelengths of light, and uniform in thickness on the order of 1 to 2 nm RMS. The lower surface 15 may include a partially-reflective coating 16, deposited thereon. Typically, the reflectivity of the lower surface 15 with the partially-reflective coating may be between 50% and 97%, preferably between 90% and 97%, more preferably between 93% and 97%, and ideally between 95% and 97% reflective. The upper surface 14 may include a highly-reflective coating 17 deposited thereon. Typically, the reflectivity of the upper surface 14 with the highly-reflective coating 17 is greater than 90%, preferably greater than 97%, and ideally greater than 99%. The mounting or blacking plate 13, e.g. a piece of glass or other transparent material, may be similarly flat on at least a contact surface 18, which is optically contacted to the highly-reflective surface 14 of the supporting substrate 12 with the highly-reflective coating 17 therebetween. The partially-reflective and highly-reflective coatings 16 and 17, respectively, may be interchanged, if desired.

The reflective coatings 16 and 17 should to be very flat, and conformed to the upper and lower surfaces 14 and 15 of the main supporting substrate 12 during the fabrication method. The reflective coatings 16 and 17 may be a metal film rather than a dielectric stack, but practically, most high reflectors will be dielectric stacks.

The VIPA 11 includes the highly-reflective coating 17 sandwiched between the supporting substrate 12 and the backing plate 13. During manufacture, the highly reflective coating 17 is deposited on the main supporting substrate 12, and the backing plate 13 is mounted on the highly-reflective coating 17. Then, the end of the VIPA 11 is beveled by polishing, or other suitable process, the ends of the main supporting substrate 12, the backing plate 13, and the highly-reflective coating 17 forming a beveled, flat input edge 19 at an acute angle α from the lower and contact surfaces 15 and 18 facing substantially away from the lower surface 15, preferably between 30° and 60°, more preferably between 40° and 50°, and ideally about 45° to define a sharp bevelled edge to the highly reflective coating 17. Ideally, the entire end of the main supporting and mounting substrates 12 and 13, along with the highly-reflective coating 17 are polished at the acute angle α, but less than the entire ends are possible, as long as the highly-reflective coating 17 and the surrounding area of the substrates 12 and 13 are beveled.

If the highly-reflective coating 17 is several wavelengths thick, which is typical for multilayer high reflector coatings, and the input edge 19 of the VIPA 11 is polished at e.g. a 45° angle α, a transition region 20 between the full-width, highly-reflective coating 17 and the surface of the assembly, i.e. the input edge 19 of the supporting substrate 12, will be approximately 0.5× to 2.0×, preferably 0.8× to 1.2×, and more preferably the same as the thickness of the highly-reflective coating 17, and much narrower than conventionally masked coatings. Because the highly-reflective coating 17 is supported on both sides by the main supporting substrate 12 and the backing plate 13, it is protected from delamination or chipping during the polishing process. The partially-reflective coating 16 may be deposited on the lower surface 15 prior to or subsequent the polishing step.

The highly-reflective coating 17 may be applied to the lower surface 15, and the partially-reflective coatings 16, may be applied to the upper surface 14, whereby the transition region 20 is in the partially-reflective coating 16 and the input light is initially incident upon the highly-reflective coating 17, if desired.

Ideally, the transition region 20 may be small enough, e.g. less than 10 µm, preferably less than 5 µm, that it is unlikely to have much adverse effect on the performance of the VIPA 11 because the input beam has some physical width that will override the effects of the transition region 20. For multilayer dielectric coatings, a visible/near IR reflective coating is likely to be 3 to 4 times thicker than the vacuum wavelength of the light it is designed to reflect. Accordingly, a highly reflective coating 17 for light with a wavelength of 1 µm would be on the order of 3 to 4 µm thick, depending on material indices, resulting in a transition zone 20 of between 1.5 µm to 8 µm, preferably 2.5 µm to 4.8 µm, and more preferably 3 µm to 4 µm wide.

Figure 4:
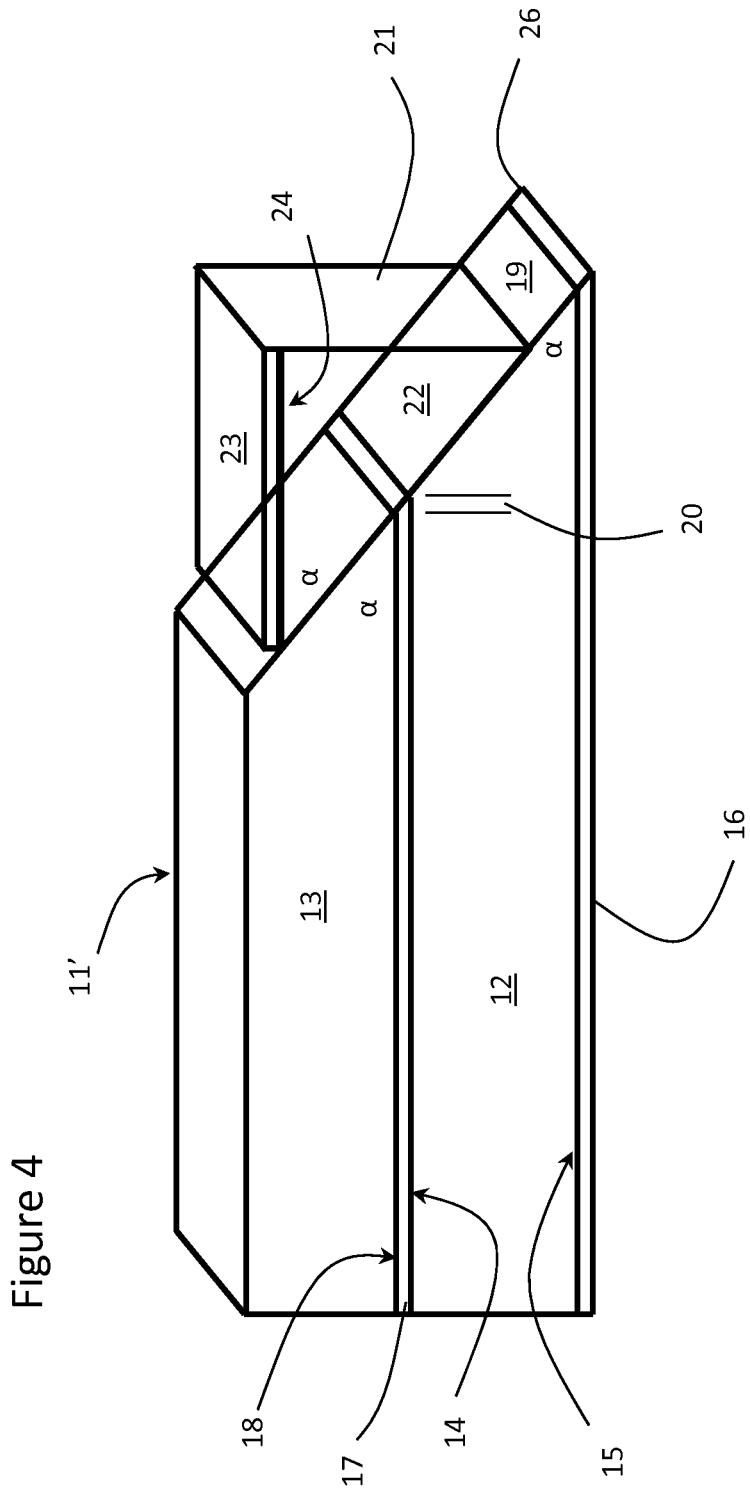
FIG. 4 illustrates an isometric view of a VIPA in accordance with another embodiment of the present invention.

The VIPA 11 is fully functional in this form, whereby the light input surface is the beveled end 19 of the main supporting substrate 12; however, the improved VIPA 11', illustrated in FIG. 4, is somewhat more convenient to use when the matching input section 21, e.g. piece of glass or other transparent material, such as a triangular prism, is provided. The matching input section 21 may comprise a beveled surface 22 matching and parallel to the input edge 19, and an anti-reflection coating 23 on an outer surface 24 thereof, providing a more convenient light input surface for the VIPA 11'. The matching input section 21 is preferably optically contacted to the input edge 19 of the VIPA 11', but could also be cemented or otherwise fixed in place.

The angled matching surface 22 of the matching input section 21 may be polished to include a beveled angle α from the outer surface complimentary to the edge surface 19, so that the input surface 24, i.e. AR coating 23, of the completed VIPA 11' is ideally parallel to the upper and lower, i.e. highly-reflective and partially-reflective, surfaces, 14 and 15, respectively. However, even if the beveled angle deviates by several degrees, the fundamental performance of the VIPA 11' is not affected. The input surface 24 may also be polished and coated before or after connection of the matching input section 21 to the input edge 19 to obtain the desired angle, e.g. a so that the input surface 24 is parallel to the upper and lower surfaces 14 and 15, respectively. Again, the partially-reflective coating 16 may be deposited before or after the mounting of the matching input section 21.

Figure 5:
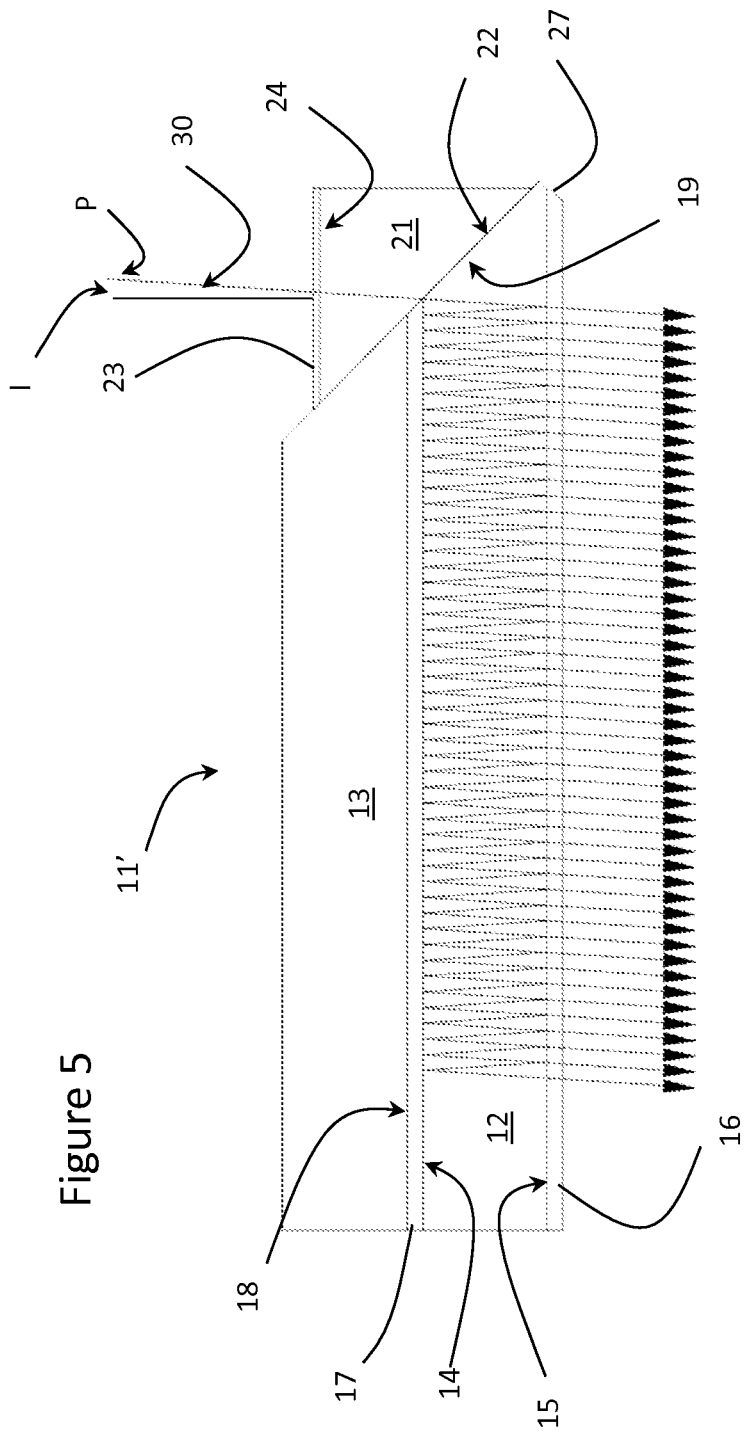
FIG. 5 illustrates a side view of the VIPA of FIG. 4 including a representation of light.

For handling reasons, the sharp edge 26 on the supporting substrate 12 at the partially-reflective coating 16 may be rounded to include a chamfered edge 27, as illustrated in FIG. 5, to prevent the partially-reflective coating 16 from chipping or becoming damaged in some other way. In this embodiment, the matching section 21, e.g. triangular prism, has a thickness in between the total thickness of the support substrate 12 and the backing plate 13, i.e. greater than the thickness of the support substrate 12, but less than the combined thickness, whereby the input surface 24 is offset downwardly from an outer surface of the backing plate 13 towards the highly-reflective surface 14 to protect the AR coating 23.

FIG. 5 illustrates the completed VIPA 11' in use. Note that the critical interface at the edge surface 19 of the highly-reflective surface 14 is protected from the local environment. Moreover, input light 30 can be input from at input port P at a much smaller entrance angle, e.g. angle of incidence I from a normal to the input surface 24, than the conventional VIPA 1 because the transition zone 20 is much smaller than that of the conventional VIPA 1, whereby reflecting light will still avoid the transition zone 20 entering and upon reflection. Accordingly, the input angle I may be less than 5°, preferably less than 2°, more preferably less than 1°, and even more preferably between 0.25° and 0.75°. Light which is to be analyzed by the VIPA 11' is collected by a system of lenses at input port P. The lenses are selected to deliver as much light as possible through the AR coated input surface 24, for reflecting multiple times from the partially reflective coating 16, while not intercepting the transition region 20 at the end of the highly-reflective coating 17. It is advantageous for the angle of incidence I to be as small as possible, so the lenses should be selected to produce a minimum beam width, i.e. a beam waist, at the lower (e.g. partially-reflective) surface 15, and the beam width at the upper (e.g. highly-reflective) surface 14 to be as small as possible consistent with the beam waist condition, the wavelength of light being observed, and the quality of the input beam.

For a conventional transition zone width of 50 μm, a wavelength of input light of 532 nm, and an input beam with an f/# of 60, the minimum input angle would be about 1.3°, but with a transition zone width of 2 μm, as in the present invention, the minimum input angle I would be about 0.51°. Following the invention, the length of the VIPA 11 (or 11') could be reduced by 2.5×. There is another effect from the reduced angle of incidence, i.e. the dispersion relation for the VIPA 11 has a strong angle dependence, so this reduction in incident angle I reduces the number of orders, which are significantly illuminated, by about a factor of 2.

Figure 6B:
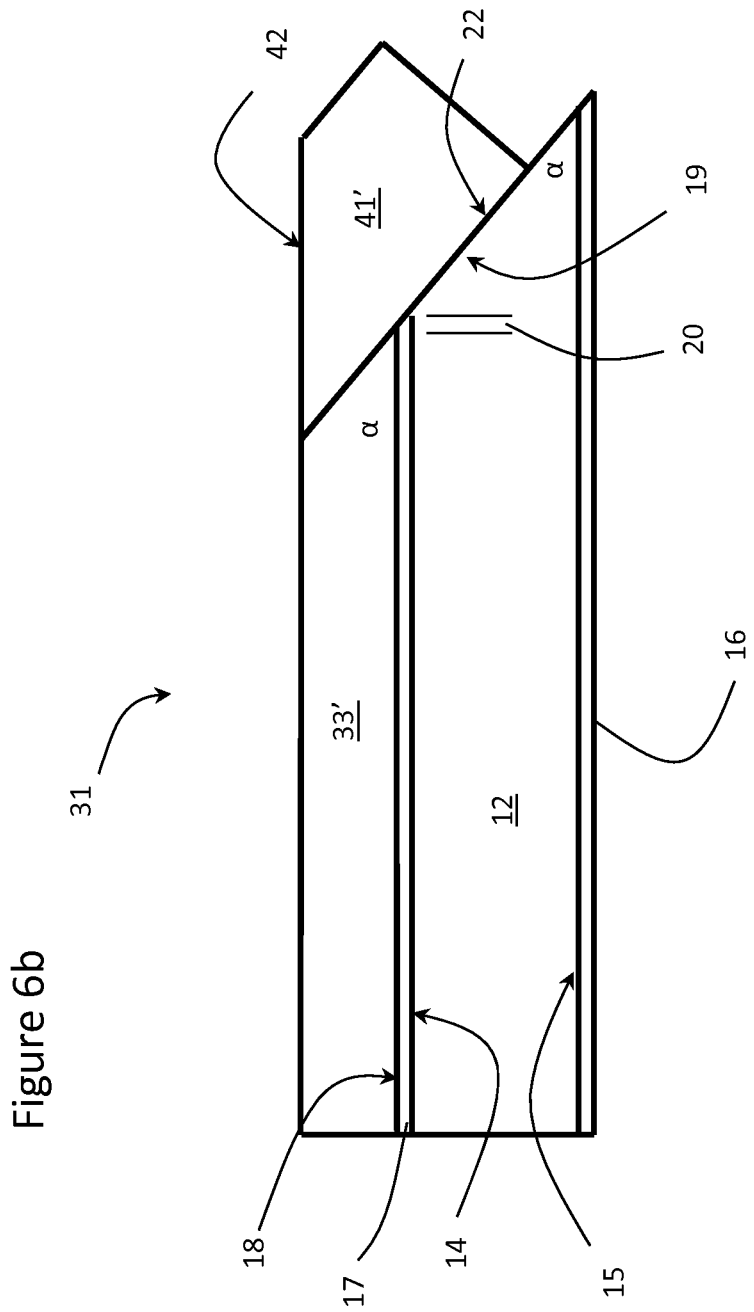
Figure 6C:
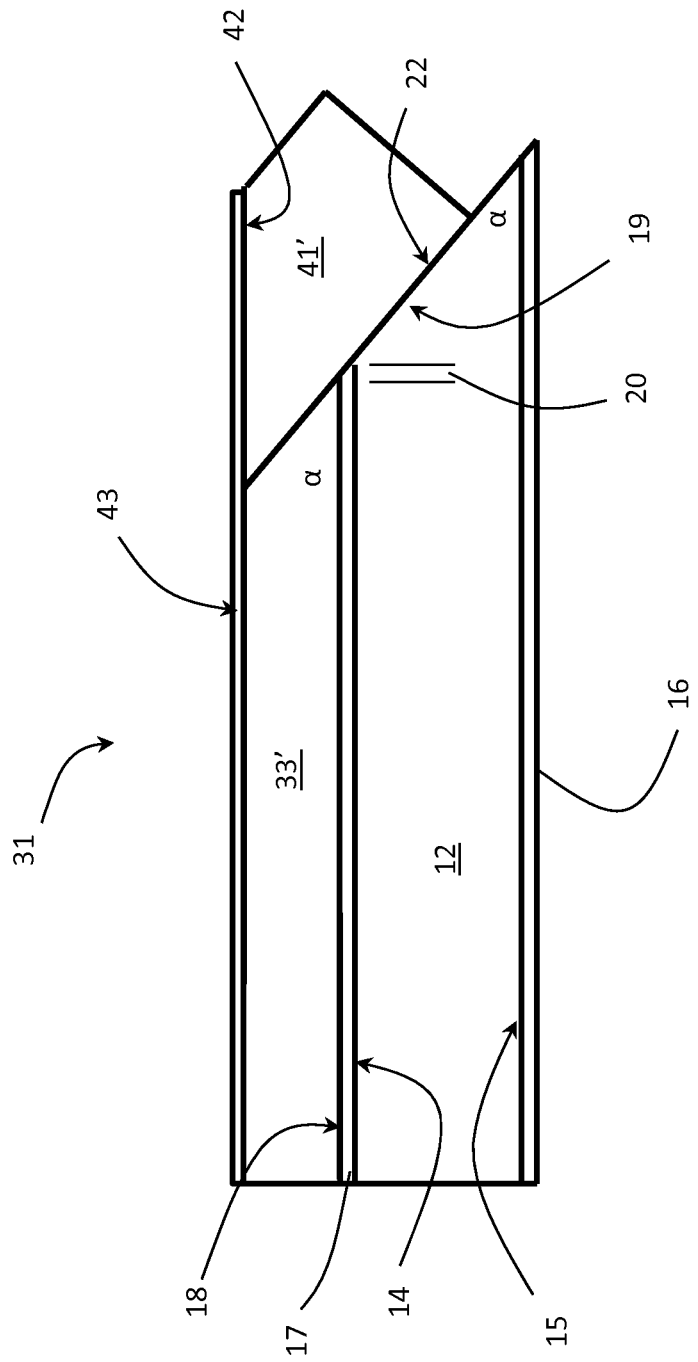
FIG. 6c illustrates a side view of a final step in the manufacturing process of FIGS. 6a and 6b.

The present design has the advantage that the matching input section 21, in particular the beveled and outer surfaces 22 and 24, respectively, may be prepared separately from the main substrate 12 and backing plate 13, and subsequently fixed together. However, it is also possible to form a VIPA 31, see FIGS. 6a to 6c, using a slightly more integrated method. In particular, the outer surfaces of a mounting substrate or backing plate 33' and a matching input section 41' may be polished after the matching input section 41 is optically contacted to the edge surface 19 of the main substrate 12. According to FIG. 6a, a relatively rough outer-surfaced backing plate 33 may be mounted on the main substrate 12, which may already have been treated on the upper and lower surfaces 14 and 15 with the highly and partially reflective coatings 17 and 16 forming the highly and partially reflective surfaces, respectively, as hereinbefore discussed. Subsequently, any flat (as hereinbefore defined) surface of a block of transparent material 41, for example a rectangular block of glass, may be mounted on the beveled edge 19 of the VIPA 31 providing what will become the matching input section 41'. With reference to FIG. 6b, the upper surface of the combined VIPA 31 may then be formed by polishing the upper surface of the backing plate 33 and the block 41 forming the finished backing plate 33' and the input matching section 41' with a flat upper surface, in particular an input surface 42, substantially parallel to the upper and lower surfaces 14 and 15, respectively. Finally, with reference to FIG. 6c, an AR coating 43 may be applied to the entire upper surface of the combined VIPA 31, including the backing plate 33' and the input surface 42 of the input matching section 41'. The partially-reflective coating 16 may be applied before or after the polishing and the AR coating 43 steps.

Figure 7:
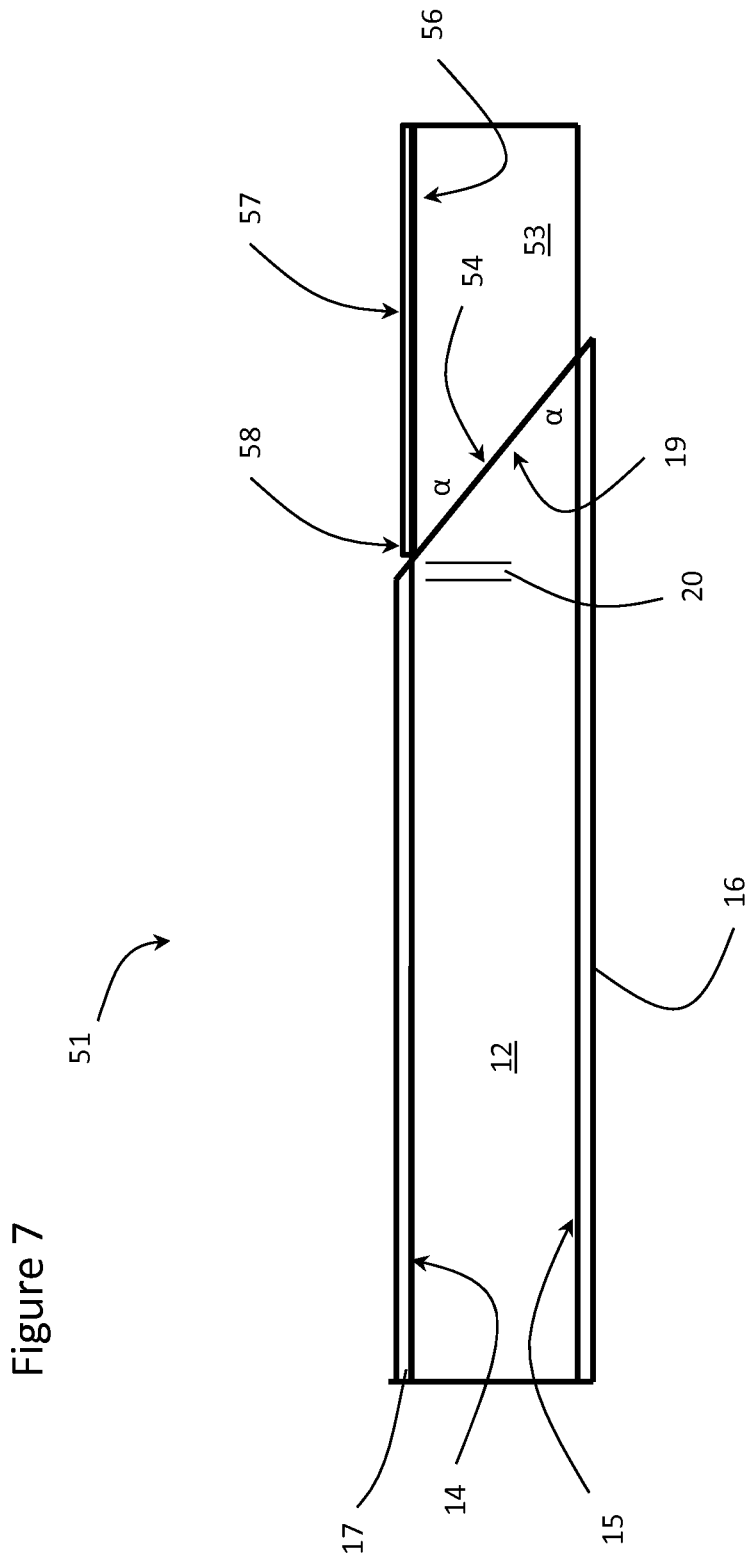
FIG. 7 illustrates a side view of a VIPA in accordance with another embodiment of the present invention.

Another embodiment of the present invention, illustrated in FIG. 7, includes a VIPA 51, which comprises only two supporting substrates of transparent material, e.g. pieces of glass, i.e. without a mounting substrate 13. The main supporting substrate 12, as hereinbefore described, includes the upper and lower surfaces 14 and 15, with the highly- and partially reflective coatings 17 and 16, respectively. During manufacture, the highly-reflective coating 17 (or the partially reflective coating 16) is deposited on the upper surface 14 of the main supporting substrate 12, and the end of the coated substrate 12 is polished (or any other suitable process) to form the beveled edge 19. Ideally, the entire end of the main substrate 12 from upper surface 14 to lower surface 15, along with the highly-reflective coating 17, are polished at the acute angle α, but less than the entire end is possible, as long as the highly-reflective coating 17 and the adjacent area of the substrate 12 are beveled. In addition, the VIPA 51 also includes a second matching input substrate or section 53, e.g. glass or other transparent material. The matching input section 53 may be polished, or other suitable process, at one end 54 to include the complementary acute bevel angle α to the beveled edge 19 of the main supporting substrate 12, whereby the input surface 56 on the matching input section 53 is parallel or substantially coplanar to the highly-reflective layer 14 on the first support substrate 12. The acute bevel angle α is between the input surface 56 and the polished end 54. An AR coating 57 may be applied to the input surface 56 prior to mounting the second input substrate 53 to the first supporting substrate 12 or after. The partially-reflective coating 16 may be deposited on the lower surface 15 of the main supporting substrate 12 at any time before or after the polishing step, and before or after the beveled end 54 of the matching input section 53 is mounted on the beveled edge 19.

Unfortunately, in the aforementioned embodiment, the highly-reflective coating 17 may not be protected by a mounting plate, and as a result is much more vulnerable to delamination or chipping. In addition, the sharp vertex 58 of the second input substrate 53 may potentially become the defining element in the transition zone 20 if it is chipped or damaged.

Figure 8:
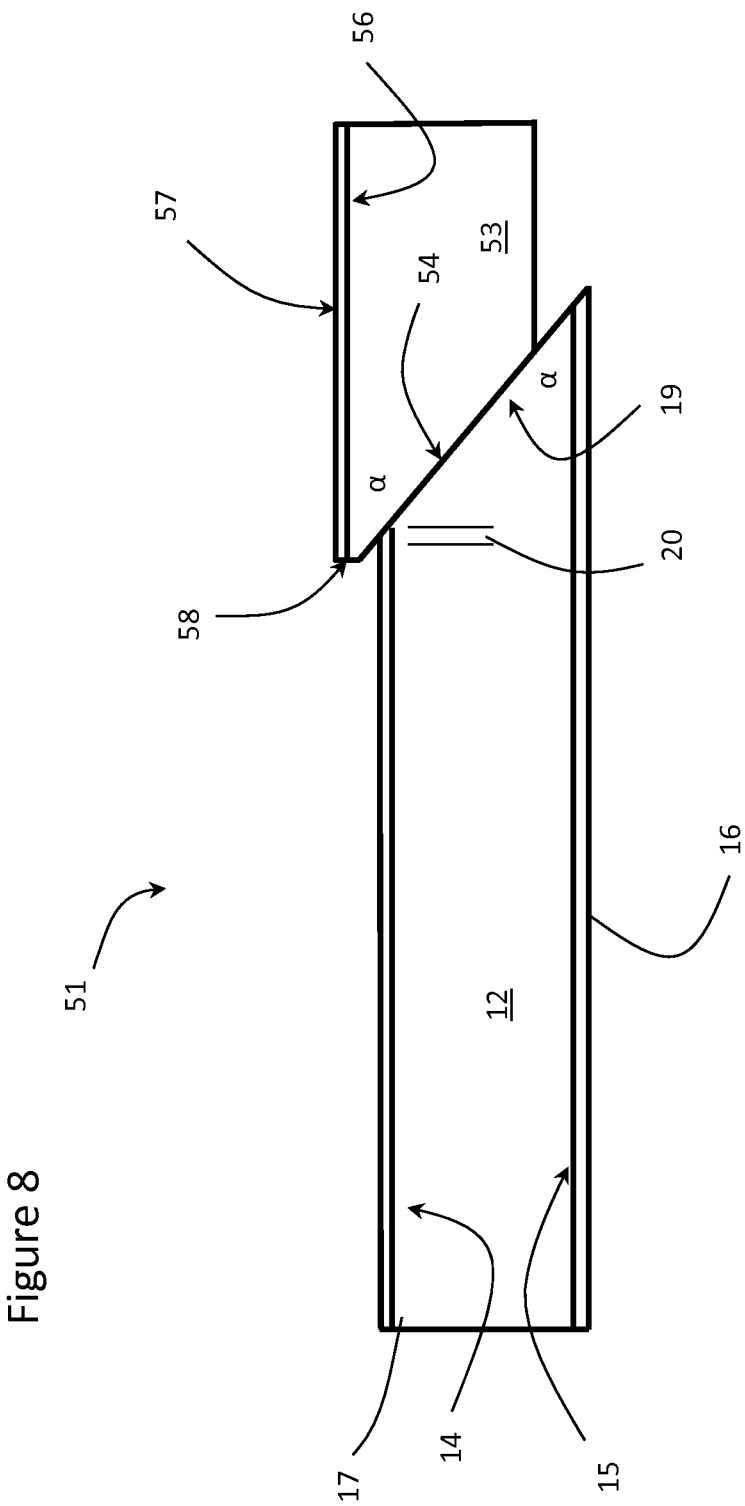
FIG. 8 illustrates a side view of a VIPA in accordance with another embodiment of the present invention.

The problem of edge chips in the matching input section 53 may be ameliorated by chamfering the acute edge 58, and slightly offsetting the input surface 56 upwardly from the upper (highly-reflective) surface 14 during the mounting step, e.g. so that the upper (highly-reflective) surface 14 may be parallel, but in between, the input surface 56 and the lower (partially-reflective) surface 15, with the input surface 56 and anti-reflection coating 57 overlapping and protecting the transition region 20, as illustrated in FIG. 8.

Polishing at acute angles α other than 45° is also within the scope of this invention. Polishing at higher angles will reduce the width of the transition region 20, but is likely to increase the losses from the interface of the beveled surfaces 19/54 (or 19/22) between the input substrate 53 (or 21 or 41') and the main substrate 12. These losses are due to the increasing angle of incidence which will result in increasing reflection losses even from very small refractive index differences. For example, for an incident angle at the interface of 60°, the reflection loss is about 0.025% for a 0.1% index difference, this increases to about 0.13% at 70°, and gets progressively worse for higher angles of incidence. At the extreme, an incident angle at the interface of 89°, will result in 20% reflection loss, whereas at 45°, this same index difference would produce a loss no worse than 1 ppm.

Figure 9:
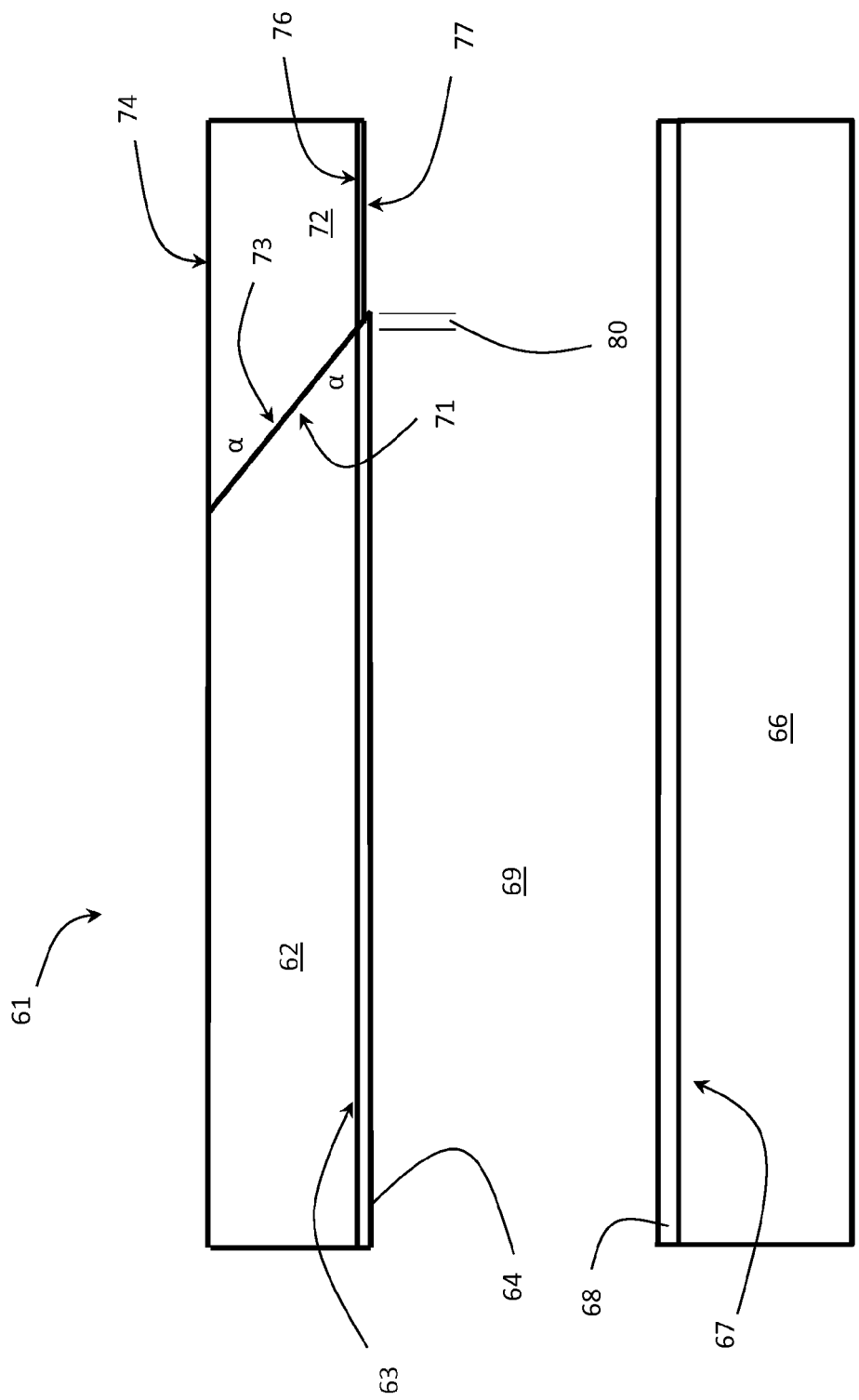
FIG. 9 illustrates a side view of a VIPA in accordance with another embodiment of the present invention.
Figure 10:
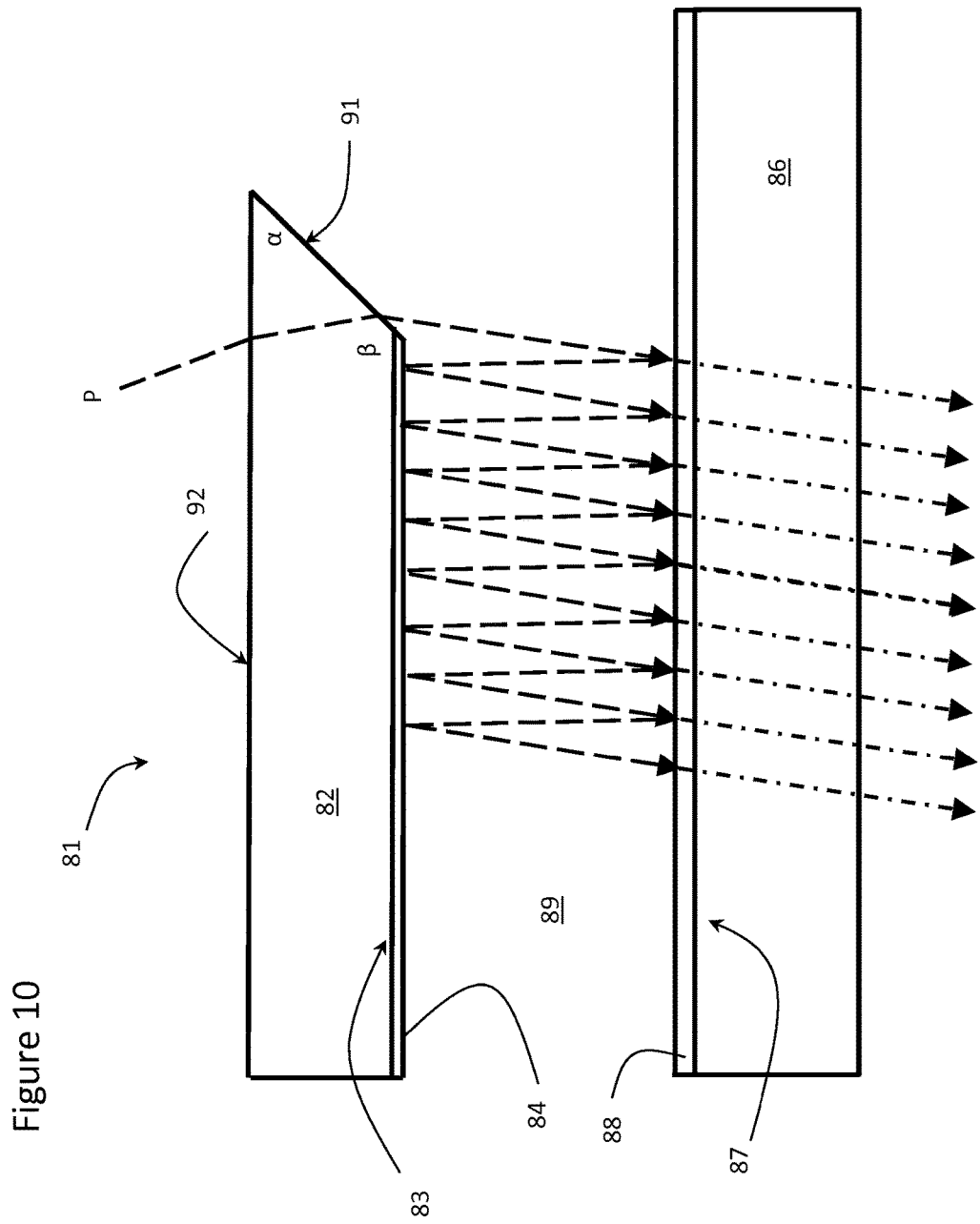
FIG. 10 illustrates a side view of a VIPA in accordance with another embodiment of the present invention.

With reference to FIGS. 9 and 10, rather than using a single, solid, consolidated optical element, with reflective coatings on opposite sides of a solid cavity or gap formed by main substrate 12, as hereinbefore disclosed, a VIPA 61 may comprise a first substrate 62 including a lower (highly-reflective) surface 63 including a highly reflective coating 64 thereon, and a separate second substrate 66 including an upper (partially-reflective) surface 67 including a partially-reflective coating 68 thereon with an air (or other suitable transparent gas, fluid or solid material) gap 69 between the two coatings 64 and 68. The first substrate 62 includes a beveled, e.g. polished or other suitable process, edge 71 forming an acute angle α, as hereinbefore described, between both the highly-reflective and the partially-reflective surfaces 63 and 67, respectively, and the beveled edge 71. A matching third input substrate 72 includes a beveled end 73, with an acute bevel angle α between an outer surface 74 and the beveled end 73, complementary to and mounted on the beveled edge 71 of the first substrate 62, whereby an input surface 76 on a lower surface of the matching third input substrate 72 may be parallel and substantially coplanar with the lower (highly-reflective) surface 63 and the highly-reflective coating 64 on the first substrate 62. An AR coating 77 may be applied to the input surface 76 prior to mounting the third input substrate 72 to the first substrate 62 or after.

During manufacture, the highly-reflective coating 64 may be deposited on the first substrate 62, and an end of the coated first substrate 62 may be polished (or other suitable process) to form the beveled edge 71 at angle α, as hereinbefore defined. The matching third substrate 72 is formed, e.g. polished or other suitable process, with the beveled end 73, outer surface 74, and input surface 76. The matching third input substrate 72 may then be mounted on the first substrate 62 with the beveled end 73 on the beveled edge 71. Before, after or during these steps, the partially-reflective coating 68 is deposited on the second substrate 66, and the two coated substrates 62 and 66 are fixed, spaced apart with only the air gap 69 therebetween, by an external frame or jig.

This configuration is slightly more complicated because after fabrication, of the first and second coated substrates 62 and 66, it is necessary to maintain their highly parallel alignment (<0.1 μRad). As with the solid configuration, the width of the transition region 80 is a key determinant of the minimum angle of incidence, and hence the length of the VIPA 61.

In another exemplary embodiment illustrated in FIG. 10, a VIPA 81 comprises a first substrate 82 including a lower (e.g. highly-reflective) surface 83 including a highly-reflective coating 84, and a separate second substrate 86 including an upper (e.g. partially-reflective) surface 87 with a partially-reflective coating 88 with an air (or other suitable transparent gas, fluid or solid material) cavity or gap 89 between the two coatings 84 and 88. The first substrate 82 includes an inverted beveled edge 91 with the beveled edge 91 facing downwardly toward the partially-reflective surface 87, i.e. forming an acute angle α, as hereinbefore defined, with the upper (uncoated) surface 92 of the first substrate 82, an obtuse angle β, (for example 90+α) with the lower (e.g. highly-reflective) surface 83, and an acute angle with the partially-reflective surface 87, e.g. α when the upper surface 92 is parallel with the upper (e.g. partially-reflective) surface 87. The refractive index of the first substrate 82 and the angles α and β are selected such that the input light travelling from input port P through air or other suitable atmosphere, through the beveled end of the first substrate 82 with a higher refractive index than air, and then out the beveled edge 91 of the first substrate 82 into the air gap 89, will be refracted twice and directed onto the upper (e.g. partially reflective) surface 86 and into the VIPA cavity 89 at a desired input angle, e.g. with an angle of incidence of less than 5°, preferably less than 1°, and more preferably between 0.25° and 0.075°.

Throughout the description, we have referred to various polished surfaces which are then coated to minimize reflection or to provide high reflectivity or partial reflectivity. The actual means of creating the surfaces is not critical to the function of the device, and although polishing is a common means of producing the required surface quality, other methods could be used, for example, cleaving of crystalline substrates. Similarly, typical optical reflectors are created by applying thin coatings to previously polished substrates, but the method of production of the coatings is not critical for the VIPA process.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A virtual image phase array (VIPA) comprising:
   a transparent support substrate;
   a first reflective coating on a first reflective surface of the transparent support substrate;
   a second reflective surface substantially parallel to the first reflective surface and separated by a gap from the first reflective coating;
   wherein the transparent support substrate and the first reflective coating include a beveled edge at a same acute angle from both the first reflective surface and the second reflective surface, the beveled edge comprising an edge of the first reflective coating flat with an edge of the transparent support substrate, the beveled edge forming a narrow beveled transition region in the first reflective coating wherein the thickness of the first reflective coating decreases toward the edge thereof;
   wherein the transparent support substrate is configured to receive input light at the beveled edge, and
   wherein the beveled edge is configured to allow the input light incident thereon to propagate through the beveled edge toward the second reflecting surface at an angle of incidence of 5° or less for bouncing between the first and second reflective surfaces multiple times while avoiding the transition region.

2. The VIPA according to claim 1, wherein the beveled edge is at between 40° and 50° from the second reflective surface.

3. The VIPA according to claim 1, further comprising an input port capable of directing the input light through the beveled edge of the transparent support substrate onto the second reflective surface at an angle of incidence of less than 1°, while avoiding the transition region during input and reflection.

4. The VIPA according to claim 1, wherein a width of the transition region is between 0.5 times to 2.0 times the thickness of the first reflective coating.

5. The VIPA according to claim 1, wherein a width of the transition region is less than 10 µm.

6. The VIPA according to claim 1, further comprising an additional section of transparent material configured to direct light through the beveled edge of the transparent support substrate onto the second reflective surface at an angle of incidence of less than 5°, the additional section including a first beveled surface mounted on the beveled edge of the transparent support substrate and a second surface at an acute angle to the first beveled surface, the second surface forming an input surface for light.

7. The VIPA according to claim 6, wherein the input surface and the first reflective surface of the transparent support substrate are substantially co-planar meeting at the transition region.

8. The VIPA according to claim 6, wherein the input surface is offset from the first reflective coating, whereby the input surface overlaps the transition region to protect the transition region.

9. The VIPA according to claim 1, further comprising a mounting substrate mounted on the first reflective surface of the transparent support substrate sandwiching the first reflective coating between the mounting substrate and the transparent support substrate to protect the first reflective coating.

10. The VIPA according to claim 9, further comprising an additional section of transparent material having a first beveled surface mounted on the beveled edge of the transparent support substrate and a second surface at an acute angle to the first beveled surface, the second surface forming an input surface for light, wherein an upper surface of the mounting substrate is co-planar with the input surface to facilitate coating thereof together.

11. The VIPA according to claim 1, further comprising a mounting substrate mounted on the first reflective surface of the transparent support substrate sandwiching the first reflective coating therebetween, the mounting substrate including a beveled edge coplanar with the beveled edge of the transparent support substrate.

12. The VIPA according to claim 1, further comprising an additional support substrate including the second reflective surface with a second reflective coating, which is separated from the first-reflective coating by an air gap.

13. The VIPA according to claim 12, wherein the beveled edge of the transparent support substrate faces toward the second reflective surface, whereby light launched through a second surface of the transparent support substrate, opposite the first reflective surface, travels through the beveled edge of the transparent support substrate into the air gap, and deflects towards the second reflective surface at an angle of incidence of less than 5°.

14. A method of fabricating a virtual image phase array (VIPA) comprising:

providing a first support substrate with a first surface and an end;

providing a first reflective coating on the first surface of the first support substrate;

providing a second reflective coating substantially parallel to the first reflective coating with a gap therebetween;

polishing the end of the first support substrate, with the first reflecting coating thereon, at an acute angle forming a beveled edge of the first support substrate and a beveled edge of the first reflective coating flat with the beveled edge of the first support substrate, thereby forming a narrow beveled transition region in the first reflecting coating at the beveled edge thereof and prior to the polishing, mounting a mounting substrate flat upon the first reflective coating so as to sandwich the first reflective coating between the first support substrate and the mounting substrate;

wherein the polishing comprises polishing both the end of the first support substrate and an end of the mounting substrate at the same time, thereby forming the beveled edge of the first reflective coating flat with a beveled edge of the mounting substrate.

15. The method according to claim 14, wherein the polishing step includes polishing the transition region to a width of between one half of the thickness of the first reflective coating to twice the thickness of the first reflective coating.

16. The VIPA according to claim 14, wherein the polishing step includes polishing the transition region to a width of less than 10 µm.

17. The method according to claim 14, wherein the polishing step includes polishing the beveled edge to an acute angle of between 40° and 50°.

18. The method according to claim 14, further comprising:

mounting a first surface of an additional matching section of transparent material on the beveled edge of the first support substrate, whereby a second surface of the additional matching section forms an input surface that is substantially coplanar or parallel to the first surface of the first support substrate.

19. The method according to claim 18, wherein the mounting step includes offsetting the input surface relative to the first reflective coating, whereby the input surface overlaps and protects the transition region.

20. The method according to claim 14, wherein the steps of providing the first and second reflective coatings comprise deposited the first and second reflective coatings on opposite sides of the first support substrate.

21. The method according to claim 14, further comprising:

connecting a first surface of an additional matching section of transparent material to the ends of the first support substrate and the mounting substrate; and simultaneously polishing an upper surface of the mounting substrate and a second surface of the matching section;

whereby the second surface of the matching section forms an input surface that is substantially parallel to the first and second reflective coatings.

22. The method according to claim 14, further comprising providing a second support substrate on which the second reflective coating is deposited, whereby the gap is an air gap between the first and second support substrates.

* * * * *